(12) United States Patent
Rothman et al.

(10) Patent No.: US 9,535,711 B2
(45) Date of Patent: Jan. 3, 2017

(54) COMPUTING PERFORMANCE AND POWER MANAGEMENT WITH FIRMWARE PERFORMANCE DATA STRUCTURE

(71) Applicant: Intel Corporation, Santa Clara, CA (US)

(72) Inventors: Michael Rothman, Puyallup, WA (US); Robert Gough, Sherwood, OR (US); Mark Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 13/977,530

(22) PCT Filed: Nov. 21, 2012

(86) PCT No.: PCT/US2012/066364
§ 371 (c)(1),
(2) Date: Jun. 28, 2013

(87) PCT Pub. No.: WO2013/078387
PCT Pub. Date: May 30, 2013

(65) Prior Publication Data
US 2014/0059337 A1    Feb. 27, 2014

Related U.S. Application Data

(60) Provisional application No. 61/563,030, filed on Nov. 22, 2011.

(51) Int. Cl.
*G06F 1/26*  (2006.01)
*G06F 9/22*  (2006.01)
(Continued)

(52) U.S. Cl.
CPC .............. *G06F 9/4403* (2013.01); *G06F 1/26* (2013.01); *G06F 1/28* (2013.01); *G06F 1/3203* (2013.01);
(Continued)

(58) Field of Classification Search
CPC .............. G06F 11/3447; G06F 11/3466; G06F 11/3672; G06F 15/7871; G06F 17/30339; G06F 1/206; G06F 1/26; G06F 1/28; G06F 1/32; G06F 1/3203; G06F 1/3234; G06F 1/324; G06F 1/3275; G06F 1/3296; G06F 2209/501; G06F 2217/78; G06F 9/22; G06F 9/30098; G06F 9/3012; G06F 9/384; G06F 9/44; G06F 9/4401; G06F 9/4403; G06F 9/445; Y02B 60/1217; Y02B 60/1285

See application file for complete search history.

(56) References Cited

U.S. PATENT DOCUMENTS

| 7,089,430 B2* | 8/2006 | Cooper ..................... G06F 1/32 713/300 |
| 2010/0205417 A1* | 8/2010 | Crisan ................... G06F 1/3203 713/1 |
| 2011/0145555 A1* | 6/2011 | Nayar ................... G06F 1/3203 713/1 |

FOREIGN PATENT DOCUMENTS

WO    2013/078387 A1    5/2013

OTHER PUBLICATIONS

International Preliminary Report on Patentability received for PCT Patent Application No. PCT/US2012/066364, mailed on Jun. 5, 2014, 8 pages.

(Continued)

*Primary Examiner* — M Elamin
(74) *Attorney, Agent, or Firm* — Green, Howard & Mughal, LLP

(57) ABSTRACT

In some embodiments, a PPM interface for a computing platform may be provided with functionality to facilitate, to an OS through the PPM interface, firmware performance data.

20 Claims, 9 Drawing Sheets

(51) Int. Cl.
*G06F 9/44* (2006.01)
*G06F 17/30* (2006.01)
*G06F 9/445* (2006.01)
*G06F 1/28* (2006.01)
*G06F 11/36* (2006.01)
G06F 11/34 (2006.01)
G06F 9/30 (2006.01)
G06F 1/20 (2006.01)
G06F 15/78 (2006.01)
G06F 1/32 (2006.01)
G06F 9/38 (2006.01)

(52) U.S. Cl.
CPC ............. *G06F 1/324* (2013.01); *G06F 1/3234* (2013.01); *G06F 1/3275* (2013.01); *G06F 1/3296* (2013.01); *G06F 9/22* (2013.01); *G06F 9/44* (2013.01); *G06F 9/4401* (2013.01); *G06F 9/445* (2013.01); *G06F 11/3672* (2013.01); *G06F 17/30339* (2013.01); G06F 1/206 (2013.01); G06F 1/32 (2013.01); G06F 9/3012 (2013.01); G06F 9/30098 (2013.01); G06F 9/384 (2013.01); G06F 11/3447 (2013.01); G06F 11/3466 (2013.01); G06F 15/7871 (2013.01); G06F 2209/501 (2013.01); *G06F 2217/78* (2013.01); *Y02B 60/1217* (2013.01); *Y02B 60/1285* (2013.01)

(56) References Cited

OTHER PUBLICATIONS

International Written Opinion received for PCT Patent Application No. PCT/US2012/066364, mailed on Mar. 26, 2013, 6 pages.
International Search Report received for PCT Patent Application No. PCT/US2012/066364, mailed on May 30, 2013, 5 pages.
Hewlett Packard Corporation, "Advanced Configuration and Power Interface Specification", Revision 4.0a, Apr. 5, 2010, 731 pages.
MacIlnis, John, "Implementing Firmware for Embedded Intel® Architecture Systems: OS-directed Power Management (OSPM) Through the Advanced Configuration and Power Interface (ACPI)", Intel Technology Journal, vol. 13, Issue 1, 2009, pp. 96-107.
Microsoft Corporation, "Extended PSS ACPI Method Specification", white paper, Apr. 2, 2007, 8 pages.
"EDK2 doxygen online documents—Firmware Encoding Index", Retrieved on Oct. 5, 2013, 4 pages. Webpage available at: http://feishare.com/edk2doxygen/dd/d77/__uefi__cpu__pkg__2__universal__2__acpi__2__s3__resume2__pei__2__s3__resume__8c__source.html.

* cited by examiner

Fig. 6

| Field | Byte Length | Byte Offset | Description |
|---|---|---|---|
| Header | | | |
| Signature | 4 | 0 | 'FDDT' Signature for the Firmware Performance Data table. |
| Length | 4 | 4 | The length of the table, in bytes, of the entire FPDT. |
| Revision | 1 | 8 | The revision of the structure corresponding to the signature field for this table. For the Firmware Performance Data Table Conforming to this revision of the specification, the revision is 1. |
| Checksum | 1 | 9 | The entire table, including the checksum field, must add to zero to be considered valid. |
| OEMID | 6 | 10 | An OEM-supplied string that identifies the OEM. |
| OEM Table ID | 8 | 16 | An OEM-supplied string that the OEM uses to identify this particular data table. |
| OEM Revision | 4 | 24 | An OEM-supplied revision number. |
| Creator ID | 4 | 28 | The Vendor ID of the utility that created this table. |
| Creator Revision | 4 | 32 | The revision of the utility that created this table. |
| Performance Records | – | 36 | The set of Performance Records |

Fig. 7

| Field | Byte Length | Byte Offset | Description |
|---|---|---|---|
| Performance Record Type | 2 | 0 | This value depicts the format and contents of the performance record. |
| Record Length | 1 | 2 | This value depicts the length of the performance record, in bytes. |
| Revision | 1 | 3 | This value is updated if the format of the record type is extended. Any changes to a performance record layout must be backwards-compatible in that all previously defined fields must be maintained if still applicable, but newly defined fields allow the length of the performance record to be increased. Previously defined record fields must not be redefined, but are permitted to be deprecated. |
| Data | – | 4 | The content of this field is defined by the Performance Record Type definition. |

Fig. 8

| Record Type Value | Type | Description |
|---|---|---|
| 0x0000 | Firmware Basic Boot Performance Pointer Record | Record containing a pointer to the Basic Boot Performance Data Record. |
| 0x0001 | S3 Performance Table Pointer Record | Record containing a pointer to an S3 Performance Table. |
| 0x0002 - 0x0FFF | Reserved | Reserved for ACPI specification usage. |
| 0x1000 - 0x1FFF | Reserved | Reserved for Platform Vendor usage. |
| 0x2000 - 0x2FFF | Reserved | Reserved for Hardware Vendor usage. |
| 0x3000 - 0x3FFF | Reserved | Reserved for BIOS Vendor usage. |
| 0x0004 - 0xFFFF | Reserved | Reserved for future use. |

Fig. 9

| Record Type Value | Type | Description |
|---|---|---|
| 0x0000 | Basic S3 Resume Performance Record | Performance record describing minimal firmware performance metrics for S3 resume operations. |
| 0x0001 | Basic S3 Suspend Performance Record | Performance record describing minimal firmware performance metrics for S3 suspend operations. |
| 0x0002 | Firmware Basic Boot Performance Data Record | Performance record showing basic performance metrics for critical phases of the firmware boot process. |
| 0x0003 - 0x0FFF | Reserved | Reserved for ACPI specification usage. |
| 0x1000 - 0x1FFF | Reserved | Reserved for Platform Vendor usage. |
| 0x2000 - 0x2FFF | Reserved | Reserved for Hardware Vendor usage. |
| 0x3000 - 0x3FFF | Reserved | Reserved for BIOS Vendor usage. |
| 0x0004 - 0xFFFF | Reserved | Reserved for future use. |

Fig. 10

| Field | Byte Length | Byte Offset | Description |
|---|---|---|---|
| Performance Record Type | 2 | 0 | 1 - S3 Performance Table Record |
| Record Length | 1 | 2 | 16 - This value depicts the length of the performance record, in bytes. |
| Revision | 1 | 3 | 1 - Revision of this Performance Record |
| *Reserved* | 4 | 4 | Reserved |
| S3PT Pointer | 8 | 8 | 64-bit processor-relative physical address of the Firmware Basic Boot Performance Table |

Fig. 11

| Field | Byte Length | Byte Offset | Description |
|---|---|---|---|
| Performance Record Type | 2 | 0 | 0 - Firmware Basic Boot Performance Pointer Record |
| Record Length | 1 | 2 | 16 - This value depicts the length of the performance record, in bytes. |
| Revision | 1 | 3 | 1 - Revision of this Performance Record |
| *Reserved* | 4 | 4 | Reserved |
| FBPT Pointer | 8 | 8 | 64-bit processor-relative physical address of the Firmware Basic Boot Performance Table |

Fig. 12

| Field | Byte Length | Byte Offset | Description |
|---|---|---|---|
| Signature | 4 | 0 | 'S3PT' is the signature to use. |
| Length | 4 | 4 | Length of the S3 Performace Table. This includes the header and allocated size of the subsequent records. This size would at minimum include the size of the header and the Basic S3 Resume Performance Record. |

Fig. 13

| Field | Byte Length | Byte Offset | Description |
|---|---|---|---|
| Runtime Performance Record Type | 2 | 0 | 0 - The Basic S3 Resume Performance Record Type. Zero to one of these records will be produced. |
| Record Length | 1 | 2 | 24 - This value depicts the length of the performance record, in bytes. |
| Revision | 1 | 3 | 1 - Revision of this Performance Record |
| Resume Count | 4 | 4 | A count of the number of S3 resume cycles since the last full boot sequence. |

| FullResume | 8 | 8 | Timer recorded at the end of BIOS S3 resume, just prior to handoff to the OS waking vector. Only the most recent resume cycle's time is retained. |
|---|---|---|---|
| AverageResume | 8 | 16 | Average timer value of all resume cycles logged since the last full boot sequence, including the most recent resume. Note that the entire log of timer values does not need to be retained in order to calculate this average. $AverageResume_{new} = (AverageResume_{old} * (REsumeCount-1) + FullResume) / ResumeCount$ |

Fig. 14

| Runtime Performance Record Type | 2 | 0 | 1 - The Basic S3 Suspend Performance Record Type. Zero to one of these records will be produced. |
|---|---|---|---|
| Record Length | 1 | 2 | 20 - This value depicts the length of the performance record, in bytes. |
| Revision | 1 | 3 | 1 - Revision of this Performance Record |
| SuspendStart | 8 | 4 | Timer value recorded at the OS write to SLP_TYP upon entry to S3. Only the most recent suspend cycle's timer value is retained. |
| SuspendEnd | 8 | 12 | Timer value recorded at the final firmware write to SLP_TYP (or other mechanism) used to trigger hardware entry to S3. Only most recent suspend cycle's timer value is retained. |

Fig. 15

| Field | Byte Length | Byte Offset | Description |
|---|---|---|---|
| Signature | 4 | 0 | 'FBPT' is the signature to use. |
| Length | 4 | 4 | Length of the Firmware Basic Boot Performance Table. This includes the header and allocated size of the subsequent records. This size would at minimum include the size of the header and the Firmware Basic Boot Performance Record. |

Fig. 16

| Field | Byte Length | Byte Offset | Description |
|---|---|---|---|
| Performance Record Type | 2 | 0 | 2 - Firmware Basic Boot Performance Data Record |
| Record Length | 1 | 2 | 48 - This value depicts the length of the performance record, in bytes. |
| Revision | 1 | 3 | 2 - Revision of this Performance Record |
| *Reserved* | 4 | 4 | Reserved |
| Reset End | 8 | 8 | Timer value logged at the beginning of firmware image execution. This may not always be zero or near zero. |
| OS Loader LoadImage Start | 8 | 16 | Timer value logged just prior to loading the OS boot loader into memory.<br>For non-UEFI compatible boots, this field must be zero |
| OS Loader StartImage Start | 8 | 24 | Timer value logged just prior to launching the currently loaded OS boot loader image.<br>For non-UEFI compatible boots, this timer value logged will be just prior to the INT 19h handler invocation. |
| ExitBootServices Entry | 8 | 32 | Timer value logged at the point when the OS loader calls the ExitBootService function for UEFI compatible firmware. For non-UEFI compatible boots, this field must be zero. |
| ExitBootServices Exit | 8 | 40 | Timer value logged at the point just prior to the OS loader gaining control back from the ExitBootServices function for UEFI compatible firmware.<br>For non-UEFI compatible boots, this field must be zero |

US 9,535,711 B2

COMPUTING PERFORMANCE AND POWER MANAGEMENT WITH FIRMWARE PERFORMANCE DATA STRUCTURE

CLAIM OD PRIORITY

This application claims priority to PCT Patent Application Serial No. PCT/US2012/066364, filed on 21 Nov. 2012 and titled "COMPUTING PERFORMANCE AND POWER MANAGEMENT WITH FIRMWARE PERFORMANCE DATA STRUCTURE," which claims priority to U.S. Provisional Application No. 61/563,030, filed on 22 Nov. 2011 and titled "CPPC, RASF, MPST, FPDT, AND EINJ TECHNOLOGY," both of which are incorporated herein by reference in their entirety.

BACKGROUND

The present invention relates generally to a platform performance management interface. In particular, it pertains to providing a firmware performance data table (FPDT) structure through a power and performance management interface in a computing platform.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 is a table showing a Firmware Performance Data Table (FPDT) format in accordance with some embodiments.

FIG. 7 is a table showing a performance record structure in accordance with some embodiments.

FIG. 8 is a table showing performance record types in accordance with some embodiments.

FIG. 9 is a table showing a runtime performance record type in accordance with some embodiments.

FIG. 10 is a table showing an S3 performance table pointer recording accordance with some embodiments.

FIG. 11 is a table showing an S4 performance table pointer record in accordance some embodiments.

FIG. 12 is a table showing an S3 Performance table header in accordance with some embodiments.

FIG. 13 is a table showing a basic S3 resume performance record in accordance with some embodiments.

FIG. 14 is a table showing a basic S3 suspend performance record in accordance with some embodiments.

FIG. 15 is a table showing a firmware basic boot performance table header in accordance with some embodiments.

FIG. 16 is a table showing a firmware basic boot performance data record structure in accordance with some embodiments.

DETAILED DESCRIPTION

Figure 1:
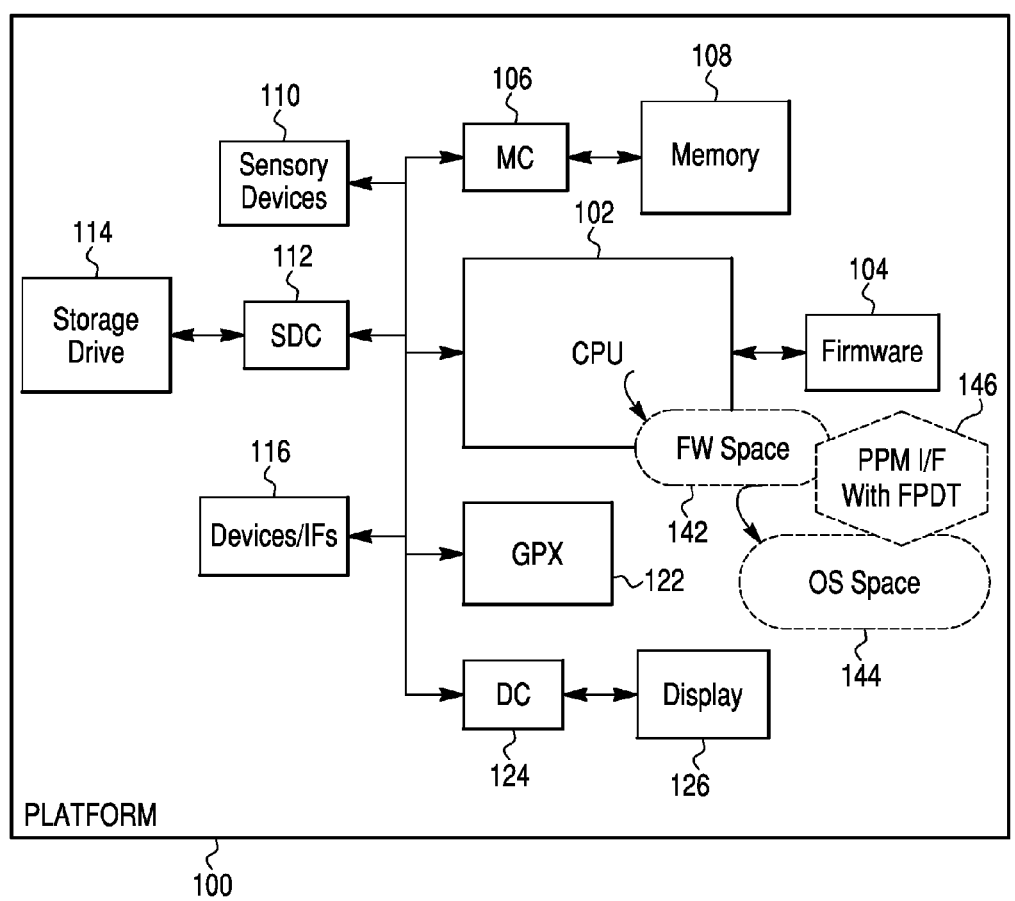
FIG. 1 is a block diagram of a computing platform with FPDT support provided through a PPM interface in accordance with some embodiments.

FIG. 1 is a diagram of a portion of a computing platform 100 with a performance and power management (PPM) interface facilitating firmware performance data (FPD) tracking in accordance with some embodiments. The computing platform, as generally illustrated in the figure, is intended to represent a variety of different computing platform types including but not limited to servers, desktop PCs, netbooks, ultra-books, tablets, smart-phones, and the like. For simplicity and ease of understanding, details and/or components, not pertinent to this disclosure, for some platform embodiments will have been omitted.

As used herein, the term "PPM" stands for performance and power management and refers to any suitable interface for enabling operating systems, as well as applications through their operating systems, to control, monitor, maintain, etc., hardware components within a platform, as long as the platform and OS, at least with regard to a relevant feature, comply with the PPM interface. An example of a PPM is the Advanced Configuration and Power Interface (ACPI).

FPD tracking, in some implementations, refers to measuring or identifying and retaining, at least to some degree, the time taken for a platform to perform various firmware boot and sleep processes. A firmware performance data table (FPDT) structure, implemented through a PPM interface, allows a platform to expose firmware performance data such as boot process times. It allows the platform, as well as the OS, to access the data. Platform and/or component manufacturers can use this information, for example, to verify (and market) their "faster" boot cycles. In some embodiments, an FPD system may measure and provide data on platform basic boot (power-on or reset) operations, as well as entry into and exits out of sleep states. In some embodiments, time data for desired mileposts (e.g., time for specific hardware) within the boot-up or boot-down processes may also be made available.

The depicted platform comprises a CPU 102, sensory devices 110 (e.g., gyros, speakers, cameras, etc.), other devices/interfaces (e.g., keypad, pointer device, USB ports, PCI ports, wireless Ifs, etc.) 116, and a graphics processor (GPX) 122, coupled together through one or more busses and/or point-to-point interconnects. The platform also includes memory 108 (e.g., DRAM) coupled through a memory controller 106 to at least the CPU 102, and it also includes firmware 104 (e.g., implemented with non-volatile memory such as flash memory) coupled to the CPU 102. The platform additionally includes a display 126 coupled through a display controller 124 to the GPX 122 and/or to the CPU 102, (it should be appreciated that while a single CPU block is shown, the platform may include multiple CPUs and/or processing cores for executing one or more OS threads and for performing various different tasks. However, for simplicity, a single CPU executing an operating system is shown herein.)

The platform further includes a storage drive 114 (e.g., a solid state drive) coupled through a storage drive controller 112 to at least the CPU 102. The storage drive may store data, applications, and one or more operating systems (OS) such as Linux, Windows™, Mac OS™, Android, etc., systems. The firmware 104 includes a BIOS, EFI or other boot/initialization software. (Note that the role of the BIOS has changed over time. For example, in some platforms, the BIOS is being replaced by the more complex EFI (Extensible Firmware Interface), but a BIOS for firmware remains in widespread use. To date, EFI has been supported in Microsoft Windows™ versions supporting OPT, in the Linux kernel 2.6.1 and later, and in Mac OS. However, the distinction between BIOS and ELI is rarely made in terminology by the average computer user, making BIOS a catch-all term for both systems. For simplicity, however, the term "firmware" will be used generally to refer to the BIOS, EFI or alternative boot/initialization code.)

Together, the operating system and firmware include software components to implement a PPM interface 146 (e.g., ACPI) for the platform. As abstractly represented in the figure, when the platform starts up, after executing primitive start code, the CPU retrieves and runs the boot software (firmware space 142) and among other things, at that time may establish data structures for the PPM interface 146. Once the firmware space (e.g., BIOS, EFI) has initialized, the OS space 144 is then established as the OS boots within the CPU. At this time, PPM modules within the OS may identify various characteristics of the platform through the PPM interface 146 that is being established.

Figure 2:
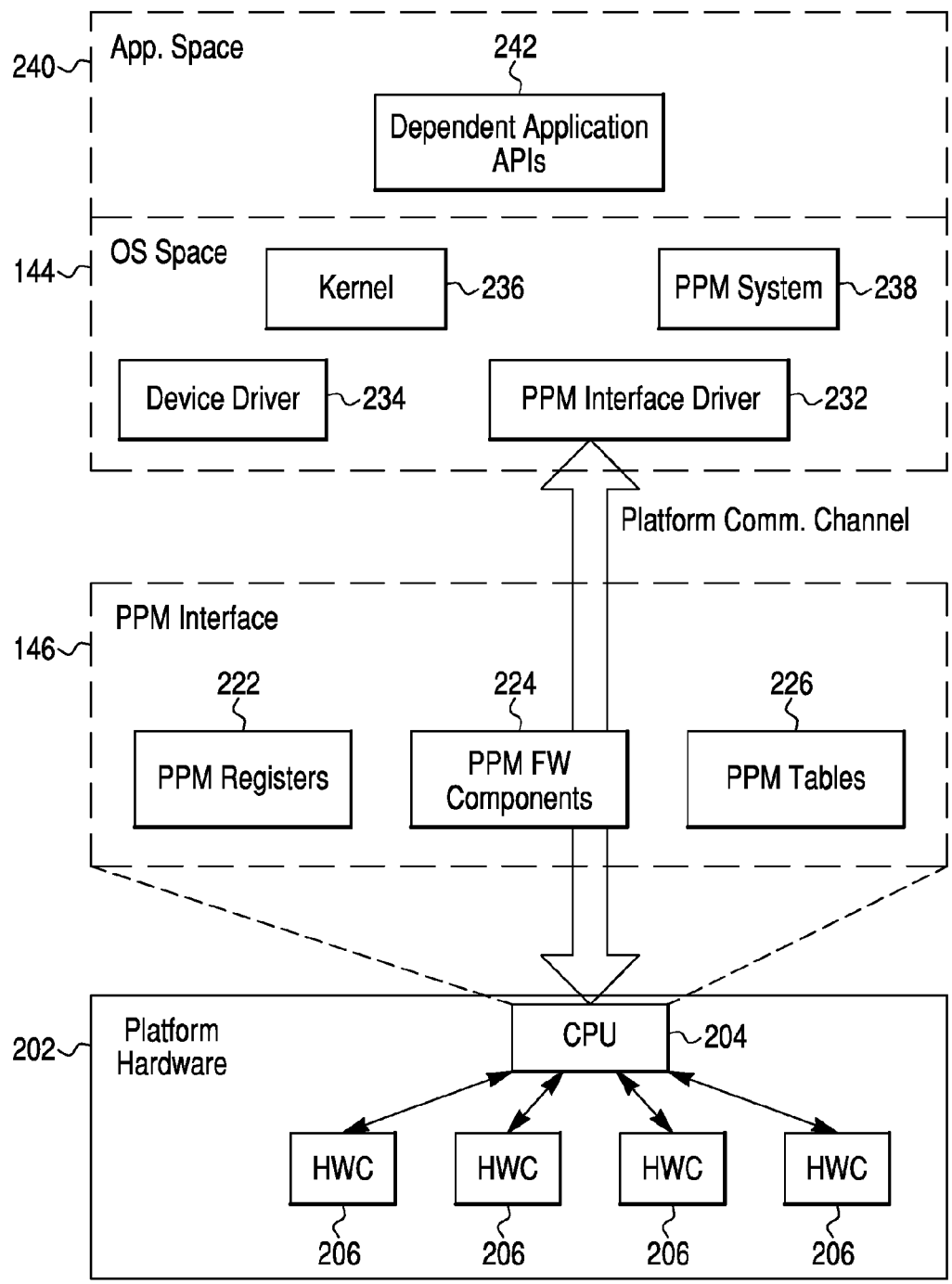
FIG. 2 is a diagram showing an abstracted representation of a PPM interface implemented on a platform in accordance with some embodiments.

FIG. 2 is a block diagram abstractly showing a PPM interface for interfacing between OS power and performance functionality, on the one hand, and platform hardware, on the other hand. (It should be noted that this diagram is drawn from an ACPI specification, which henceforth, is used primarily as an example for conveniently presenting some of the principles taught herein. However, the figure has been abstracted and modified to conform with concepts particular to this disclosure. For example, the more general term: "PPM" is used rather than "ACPI" in some places and instead of "OSPM" within the OS space. It should be appreciated that ACPI is a specific implementation of a PPM interface.)

With pertinence to the present disclosure, platform hardware 202 is shown with CPU 102 and hardware components (HWC) 206. The HWC units are represented in that their initialization times may be tracked by an FPDT in accordance with some embodiments. An HWC 206 may correspond to specific circuits, logic units, controllers, executing software, etc.

The CPU 102, as discussed above, executes firmware and the OS, thereby establishing the PPM interface 146, OS Space 144, and application space 240. The application space includes APIs 242 for applications to run on the platform. The OS space 144 includes PPM interface driver 232, device drivers 234, an OS kernel 236, and a PPM system 238, which facilitates performance and power management from the OS. In the depicted embodiment, a platform control channel (PCC) is implemented by the PPM interface to communicate between the OS PPM functionality and the PPM hardware features.

The PPM interface 146 comprises PPM registers 222, PPM firmware components 224 and PPM tables 226. The registers 222 may correspond to specific registers, e.g., dedicated PPM registers in the hardware, e.g., within the CPU or as part of a controller such as a baseboard controller, or to virtual registers created in software. They also may be a constrained part of the hardware interface, described (at least in location) by the PPM Tables. ACPI, for example, defines a hardware register interface that an ACPI-compatible OS may use to control core power management and performance features of platform hardware, as described in Section 4 of the ACPI 5.0 Specification (the ACPI Hardware Specification).

The PPM firmware components 224 include portions of the firmware corresponding to PPM implementations. Typically, they are used to implement interfaces for sleep, wake, and some restart operations. Pertinent to this disclosure, among other things, they may also include components for defining PPM data structures and tables, including those used for FPDT structures, and they may also include one or more routines for maintaining and/or updating data and/or addresses in the tables. (Note that some of the ACPI features corresponding to firmware components 224 are described in Section 5.3, "Namespace", of the ACPI 5.0 Specification.

The PPM tables, in general, describe the interfaces to the hardware. Some descriptions limit what can be built. For example, some controls may be embedded in fixed blocks of registers, and the table specifies the address of the register block. Most descriptions allow the hardware to be built in arbitrary ways and can describe arbitrary operation sequences needed to make the hardware function. (For the rest of the disclosure, ACPI tables will be described as examples of suitable PPM table structures. ACPI tables are generally described in Section 5.2 of the ACPI 5.0 Specification.)

ACPI tables having "Definition Blocks" can make use of a pseudo-code type of language, the interpretation of which can be performed by the OS. That is, OSPM (corresponds to PPM system 238) includes and uses an interpreter that executes procedures encoded in the pseudo-code language and stored in the ACPI tables containing "Definition Blocks." The pseudo-code language, known as ACPI Machine Language (AML), is a compact, tokenized, abstract type of machine language. In some embodiments, AML routines may be used to facilitate firmware performance data acquisition and generation, as presented below.

Figure 3:
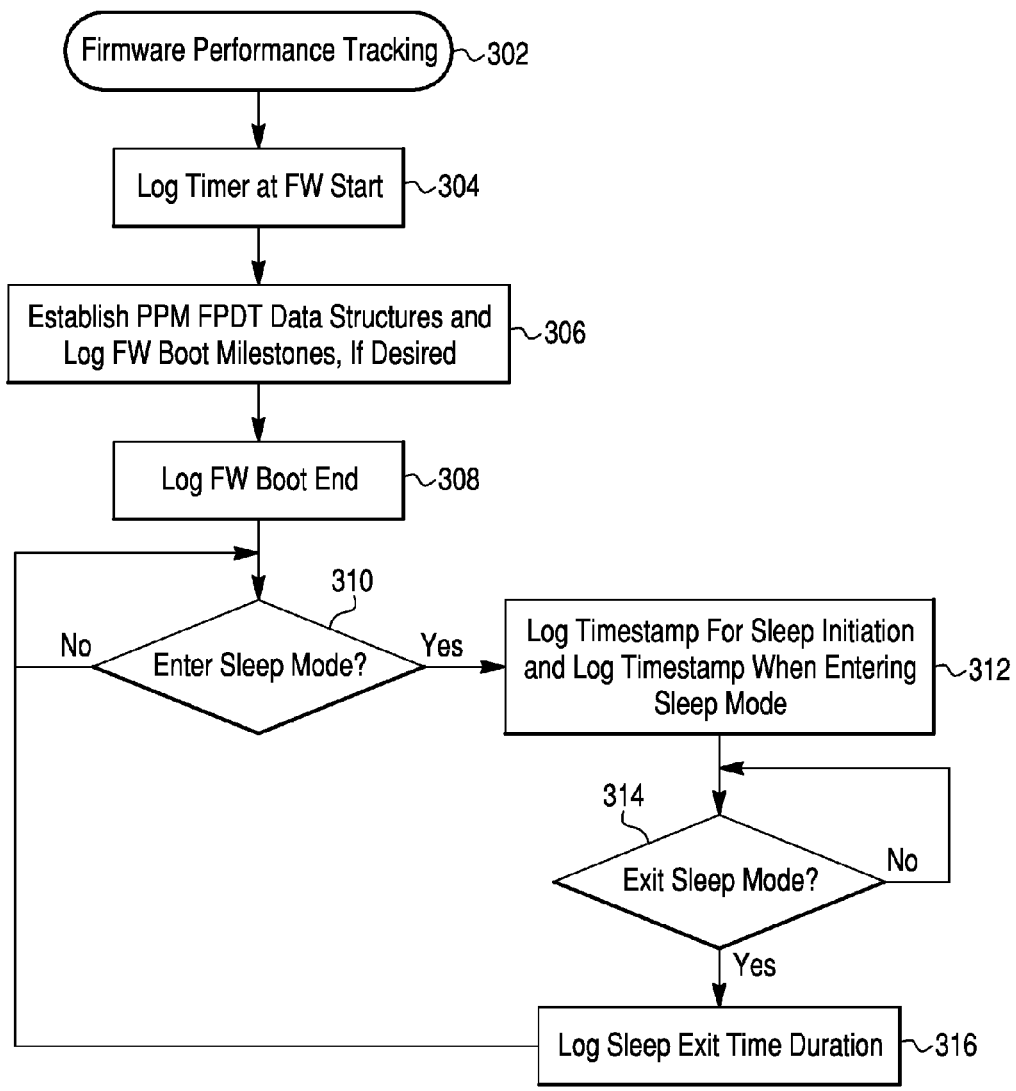
FIG. 3 is a general routine for tracking FPDT services through a PPM interface in accordance with some embodiments.

FIG. 3 shows a routine 302 for tracking firmware performance in accordance with some embodiments. At 304, the routine may log the time when the firmware begins. (This may correspond to a Reset End, as described in FIG. 16.) In some platforms, the firmware boot may not actually start at, or near, 0, when the CPU is powered on or resets. This is because other preliminary processing may occur when the CPU is started (powered on or reset) before it gets to the firmware. Accordingly, by logging the time timestamp), a routine or user can assess actual firmware boot time more precisely, i.e., from when it actually begins and not simply when the CPU starts. (It should be appreciated that logging a timer or timestamp refers to logging, or marking a time unit. Usually, a CPU or other platform clock or counter will generate a running count from when the CPU starts, and thus, this CPU count or clock may be used for logging time, or time unit, as discussed herein. For example, with many x86 platforms, a rdtsc command allows a running routine to read the current timestamp counter. It should be appreciated, however, that any suitable clock or counter, whether providing an actual time, relative time, or derivation thereof, could be used.)

At 306, as the firmware is booting, it establishes an FPDT structure within the PPM interface. For example, in an ACPI implementation, it may create data structures based on the tables illustrated in FIGS. 6-16. The running booting firmware may also log designated timing milestones such as the beginnings or endings of hardware component initializations, e.g., for a better understanding of how long individual hardware components are taking to boot.

At 308, the running firmware logs the end of the firmware boot. In some embodiments, this may occur when he OS loader is launched. At 310, the routine, from the perspective of the running firmware, waits for a sleep mode to be entered. Any suitable sleep mode state could satisfy this condition. In some ACPI implementations, entry into at least an S3 sleep state satisfies sleep mode entry within this context.

If a sleep mode is to be entered, then at 312, the routine (e.g., firmware FPDT routine) logs when the sleep mode entry is initiated and when it is entered. (In some ACPI embodiments, this may correspond to SuspendStart and SuspendEnd functions described in FIG. 14). The difference between these values may correspond to a the time consumed for the platform to enter into the sleep mode. In some embodiments, data along with other FP data (including other sleep mode related FP data) may be stored in memory that is reserved for the firmware and not alterable by OS space.

When the sleep mode is to end (platform to become active), then the routine proceeds to 316, where it logs the time taken to come out of the sleep mode. In ACPI implementations, this may correspond to a FullResume function described in FIG. 14. From here, the routine proceeds back to the 310 loop, awaiting the next sleep event.

The general ACPI table structure, and then, the particular ACPI FPDT structure, will be described. To give hardware vendors flexibility in choosing their implementation, ACPI uses tables to describe system information, features, and methods for controlling those features. These tables list devices, e.g., devices on the system board or devices that cannot be detected or power managed using some other hardware standard. They also may list system capabilities such as the sleeping power states supported, a description of the power planes and clock sources available in the system, batteries, system indicator lights, and so on. This enables OSPM (PPM system 238 in OS space for ACPI) to control system devices without needing to know how the system controls are implemented.

Figure 4:
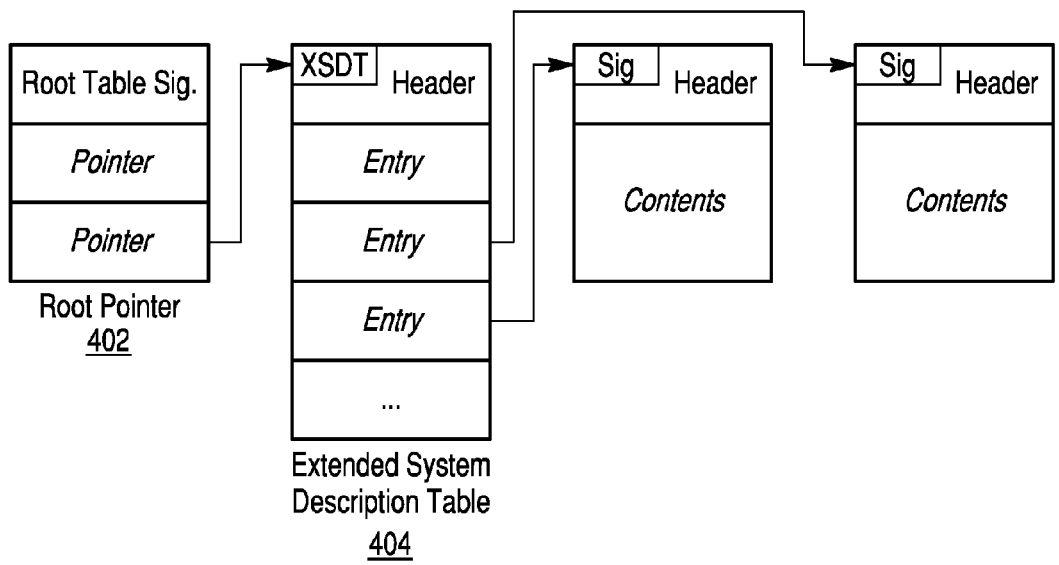
FIG. 4 is a diagram showing a root pointer to a table structure in an ACPI interface in accordance with some embodiments.

FIG. 4 shows a general structure for implementing such tables in accordance with some embodiments. A Root System Description Pointer (RSDP) structure 402 is located in the system's memory address space and may be setup by the platform firmware. This structure contains the address of the Extended System Description Table (XSDT) 404, which references other description tables that provide data to OSPM, supplying it with knowledge of the base system's implementation and configuration.

System description tables should start with identical headers. The primary purpose of the system description tables is to define for OSPM various industry-standard implementation details. Such definitions enable various portions of these implementations to be flexible in hardware requirements and design, yet still provide OSPM with the knowledge it needs to control hardware directly.

OSPM locates that Root System Description Table by following the pointer in the RSDP structure. The RSDT starts with the signature 'RSDT' followed by an array of physical pointers to other system description tables that provide various information on other standards defined on the current system. The OSPM examines each table for a known signature. Based on the signature, OSPM can then interpret the implementation-specific data within the table.

Figure 5:
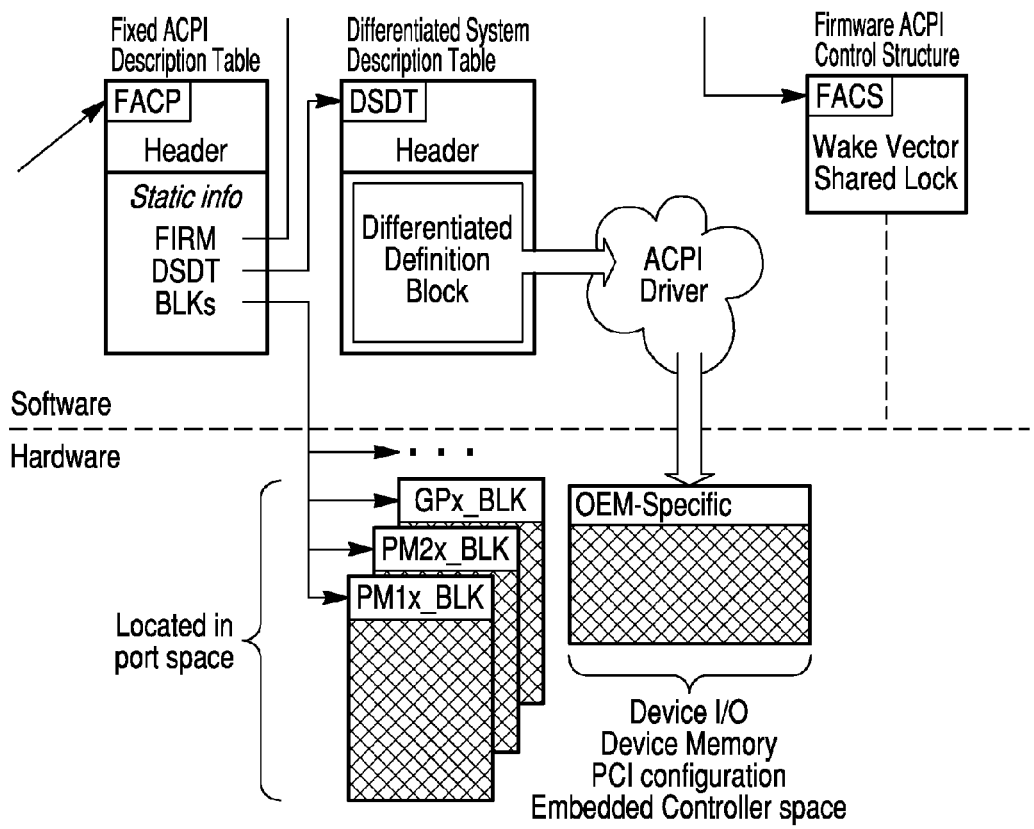
FIG. 5 is a diagram showing a description table structure for an ACPI interface in accordance with some embodiments.

With reference to FIG. 5, the Extended System Description Table (XSDT) is further described. It points to other tables in memory. The first table pointed to by pointer 402, the XSDT points to the Fixed ACPI Description table (FADT). The data within this table includes various fixed-length entries that describe the fixed ACPI features of the hardware. The FADT table refers to the Differentiated System Description Table (DSDT), which contains information and descriptions for various system features. The relationship between these tables is shown in FIG. 5.

When the OS initializes during boot, the OSPM finds the RSDP structure. When the OSPM locates the structure, it looks at the physical address for the Root System Description Table or the Extended System Description Table. The Root System Description Table starts with the signature "RSDT", while the Extended System Description Table starts with the signature "XSDT". These tables contain one or more physical pointers to other system description tables that provide various information about the system. As shown in FIG. 5, there should always be a physical address in the Root System Description Table for the Fixed ACPI Description table (FADT).

When OSPM follows a physical pointer to another table, it examines each table for a known signature. Based on the signature, OSPM can then interpret the implementation-specific data within the description table.

The purpose of the FADT is to define various static system information related to configuration and power management. The Fixed ACPI Description Table starts with the "FACP" signature. The FADT describes the implementation and configuration details of the ACPI hardware registers on the platform.

The GPE0_BLK and GPE1_BLK blocks provide the foundation for an interrupt-processing model for Control Methods. The P_BLK blocks are for controlling processor features. Besides ACPI Hardware Register implementation information, the FADT also contains a physical pointer to a data structure known as the Differentiated System Description Table (DSDT), which is encoded in Definition Block format.

A Definition Block contains information about the platform's hardware implementation details in the form of data objects arranged in a hierarchical (tree-structured) entity known as the "ACPI namespace", which represents the platform's hardware configuration. Definition blocks loaded by OSPM combine to form one namespace that represents the platform. Data objects are encoded in a format known as ACPI Machine Language or AML for short. Data objects encoded in AML are "evaluated" by an OSPM entity known as the AML interpreter. Their values may be static or dynamic. The AML interpreter's dynamic data object evaluation capability includes support for programmatic evaluation, including accessing address spaces (for example, I/O or memory accesses), calculation, and logical evaluation, to determine the result. Dynamic namespace objects are known as "control methods". OSPM "loads" or "unloads" an entire definition block as a logical unit—adding to or removing the associated objects from the namespace. The DSDT should be loaded by OSPM at boot time and should not be unloaded. It contains a Definition Block named the Differentiated Definition Block that contains implementation and configuration information OSPM can use to perform power management, thermal management, or Plug and Play functionality that goes beyond the information described by the ACPI hardware registers.

Definition Blocks can either define new system attributes or, in some cases, build on prior definitions. A Definition Block can be loaded from system memory address space. One use of a Definition Block is to describe and distribute platform version changes.

Definition blocks enable wide variations of hardware platform implementations to be described to the ACPI-compatible OS while confining the variations to reasonable boundaries. Definition blocks enable simple platform implementations to be expressed by using a few well-defined object names.

Some operators perform simple functions and others encompass complex functions. The power of the Definition Block comes from its ability to allow these operations to be glued together in numerous ways, to provide functionality to OSPM. The operators present are intended to allow many useful hardware designs to be ACPI-expressed, not to allow all hardware designs to be expressed.

FIG. 6-16 show the table structure of ACPI FPDT features. FIG. 6 is a table showing the format for the Firmware Performance Data Table (FPDT), which provides descriptions and structure for platform initialization performance records. (Note that the FPDT is a structure that may, and with ACPI does, include multiple tables that may organizationally linked to one another, as described herein.) The information in these performance records represents firmware boot performance data relating to specific tasks within a firmware hoot process.

The ACPI FPDT includes two mileposts that are part of most, if not all, platform hoot processes, and it provides for these mileposts to be logged for basic boot, as well as for sleep related boot. These mileposts are: (1) the end of CPU reset sequence (the timer value may be noted at the beginning of firmware initialization), and (2) handoff to the OS loader. The difference between these two mileposts corresponds to a firmware boot time. (Note that in some embodiments, additional mileposts, e.g., when individual hardware components initialize within the overall firmware boot, may also be included within this structure, and other information is also specified by ACPI as discussed below.

(Note that this information represents a firmware boot performance data set that could be used to track performance of each UEFI phase, and could be useful for tracking impacts resulting from changes due to hardware/software configuration. In addition, timer values are expressed in nano-second increments. For example, if a record indicates an event occurred at a timer value of 25678, this means that 25.678 micro-seconds have elapsed from the last reset of the timer measurement.)

FIG. 7 is a table showing a structure for performance records in an FPDT in accordance with ACPI. A performance record includes a sub-header including a record type and length, and a set of data, which may include a timer. The format of the record layout is specific to the record type. In this manner, records need be only as large as needed to contain the specific type of data to be conveyed.

The table of FIG. 8 describes the various types of records contained within the FPDT, and their associated Performance Record Type. Note that unless otherwise specified, multiple performance records are permitted in the FPDT for a given type, because some events can incur multiple limes during the boot process.

The table of FIG. 9 describes the various types of runtime records and their associated Runtime Performance Record types. These Records are not typically contained within the FPDT table itself; but instead are referenced by their respective pointer records in the FPDT. The pointers may be used to point to, and store the records in, memory space that cannot be altered by the OS.

FIG. 10 is a table showing an S3 performance table pointer record. The S3 Performance Table Pointer Record contains a pointer to the S3 Performance Table. The S3 Performance table, itself, exists in a range of memory described as ACPI AddressRangeReserved in the system memory map. The record pointer may be a required entry in the FPDT for any system supporting the S3 state, and the pointer should point to a valid static physical address. Only one of these records will usually be produced.

The Firmware Basic Boot Performance Pointer Record contains a pointer to the Firmware Basic Boot Performance Data Record. The Firmware Basic Boot Performance Data Record, itself, exists in a range of memory described as ACPI AddressRangeReserved in the system memory map. The record pointer is a required entry in the FPDT for any system and the pointer should point to a valid static physical address. Only one of these records will usually be produced.

With reference to FIGS. 12-14, the S3 Performance Table resides outside of the FPDT. It includes a header, defined in FIG. 12, and one or more Performance Records (see FIGS. 13 and 14).

Event entries should be initialized to zero during the initial boot sequence, and overwritten during the BIOS (Firmware) S3 resume sequence. The S3 Performance Table should include the Basic S3 Resume Performance Record (FIG. 13). Other entries are optional.

FIG. 15 is a table showing a firmware basic boot performance table header. The Firmware Basic Boot Performance Table resides outside of the FPDT. It includes a header, defined in FIG. 15), and one or more Performance Records.

FIG. 16 is a table showing a firmware basic boot performance data record structure. A firmware basic boot performance data record which contains timer information associated with final OS loader activity as well as the data associated with starting and ending boot time information.

The invention is not limited to the embodiments described, but can be practiced with modification and alteration within the spirit and scope of the appended claims. It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme.

What is claimed is:

1. A computing platform, comprising:
   a non-volatile memory having a firmware boot program; and
   a CPU to execute the firmware boot program when the CPU is reset, the firmware boot program including instructions to create Performance and Power Management (PPM) interface data structures including a firmware performance data table (FPDT) structure to track one or more firmware boot parameters.

2. The computing platform of claim 1, in which the firmware boot program comprises instructions, that when executed, log a timer value to indicate a firmware boot start time.

3. The computing platform of claim 2, in which the logged firmware boot start time value is used to populate a RestEnd performance record in an Advanced Configuration and Power Interface (ACPI) FPDT structure.

4. The computing platform of claim 1, in which the FPDT is to track firmware boot time when the CPU is reset, and wherein the firmware boot time is to start when the firmware is launched.

5. The computing platform of claim 1, in which the FPDT is to track a suspend time duration the platform to transition from an active to a sleep state.

6. The computing platform of claim 5, in which the sleep state is an S3 system sleep state.

7. The computing platform of claim 5, in which the suspend time duration is based on a suspend start time when an Operating System (OS) initiates the sleep state and a suspend end time when the firmware is to trigger hardware entry into the sleep state.

8. The computing platform of claim 1, in which the FPDT is to track a resume time for the platform to transition to an active state from a sleep state.

9. The computing platform of claim 8, in which the FPDT is to log a full resume value that corresponds to a timer value when the firmware transitions control to a hardware vector for entering the active state.

10. A computing platform, comprising:
a first memory storage device having instructions for an operating system (OS) including OS Performance and Power Management (PPM) components for a PPM interface; and
a second memory storage device having instructions for a firmware boot program including firmware PPM components for a PPM interface, the OS and firmware PPM instructions, when executed, to establish a PPM interface between the OS and platform hardware, the PPM interface including a firmware performance data structure to track firmware performance characteristics.

11. The computing platform of claim 10, comprising one or more hardware components to be initialized when the firmware boot program executes upon a system power-up, wherein the firmware performance data structure is to track initialization times for at least some of the hardware components.

12. The computing platform of claim 10, in which the firmware performance data structure is a firmware performance data table (FPDT) in an Advanced Configuration and Power Interface (ACPI) PPM.

13. The computing platform of claim 12, in which the FPDT comprises a performance record structure.

14. The computing platform of claim 12, in which FPDT comprises a runtime performance record type table.

15. The computing platform of claim 12, in which the FPDT comprises an S3 performance table pointer record structure.

16. The computing platform of claim 12, in which the FPDT comprises a firmware basic boot performance data record structure.

17. An apparatus, comprising:
a computer platform having firmware including Advanced Configuration and Power Interface (ACPI which is to build a firmware performance data table (FPDT) structure for an ACPI interface.

18. The apparatus of claim 17, in which the FPDT structure includes a performance record structure comprising performance records with firmware performance data.

19. The computing platform of claim 17, in which the FPDT comprises a runtime performance record type table.

20. The computing platform of claim 17, in which the FPDT comprises an S3 performance table pointer record structure.

* * * * *